(12) United States Patent
Rainov et al.

(10) Patent No.: US 11,128,331 B2
(45) Date of Patent: Sep. 21, 2021

(54) METHODS AND SYSTEMS FOR UTILIZING ULTRA-EFFICIENCY LOW NOISE CONFIGURATIONS FOR PHASED ARRAY ANTENNAS

(71) Applicant: MAXLINEAR, INC., Carlsbad, CA (US)

(72) Inventors: Roman Rainov, Petah Tikva (IL); Uri Kanari, Tel-Aviv (IL); Natan Mizrahi, Giv'ataim (IL); Kobi Sturkovich, Netanya (IL)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 16/879,745

(22) Filed: May 20, 2020

(65) Prior Publication Data

US 2021/0075455 A1    Mar. 11, 2021

Related U.S. Application Data

(63) Continuation of application No. 15/912,225, filed on Mar. 5, 2018, now abandoned.

(51) Int. Cl.
| | |
|---|---|
| *H04B 1/40* | (2015.01) |
| *H01Q 3/00* | (2006.01) |
| *H01Q 21/00* | (2006.01) |
| *H04B 1/16* | (2006.01) |
| *H01Q 21/22* | (2006.01) |

(52) U.S. Cl.
CPC ............... *H04B 1/16* (2013.01); *H01Q 21/22* (2013.01)

(58) Field of Classification Search
CPC ... H04B 1/16; H04B 1/40; H01Q 3/00; H01Q 3/26; H01Q 3/28; H01Q 3/30; H01Q 3/36; H01Q 21/00; H01Q 21/061; H01Q 21/065; H01Q 21/22
See application file for complete search history.

(56) References Cited

U.S. PATENT DOCUMENTS

| | | | | |
|---|---|---|---|---|
| 10,439,284 | B2* | 10/2019 | Wang | H01Q 21/0025 |
| 2016/0381570 | A1* | 12/2016 | Lysejko | H04L 43/0829 |
| | | | | 455/562.1 |
| 2018/0091203 | A1* | 3/2018 | Kufer | H04B 7/0617 |
| 2018/0351619 | A1* | 12/2018 | Khan | H04B 7/0617 |
| 2019/0253899 | A1* | 8/2019 | Shi | H04W 48/16 |

* cited by examiner

*Primary Examiner* — Blane J Jackson
(74) *Attorney, Agent, or Firm* — Maschoff Brennan

(57) ABSTRACT

Systems and methods are provided for utilizing ultra-efficiency low noise configurations for phased array antennas. Radio frequency integrated circuits (RFICs) may be used in phased array antennas to enable configuring large number of phase shifters in highly efficient manner, and to do so in optimal manner, such as with low noise.

11 Claims, 5 Drawing Sheets

METHODS AND SYSTEMS FOR UTILIZING ULTRA-EFFICIENCY LOW NOISE CONFIGURATIONS FOR PHASED ARRAY ANTENNAS

RELATED APPLICATIONS

This application is a continuation of U.S. patent application Ser. No. 15/912,225, filed Mar. 5, 2018, titled METHODS AND SYSTEMS FOR UTILIZING ULTRA-EFFICIENCY LOW NOISE CONFIGURATIONS FOR PHASED ARRAY ANTENNAS, which is incorporated herein by reference.

TECHNICAL FIELD

Aspects of the present disclosure relate to communication technologies. More specifically, implementations in accordance with the present disclosure relate to methods and systems for a utilizing ultra-efficiency low noise configurations for phased array antennas.

BACKGROUND

Various issues may exist with existing phased array antennas and/or conventional approaches for utilizing them. In this regard, conventional systems and methods, if any existed, for utilizing phased array antennas in conjunction with communication in certain bands may be costly, inefficient, and/or ineffective. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for a utilizing ultra-efficiency low noise configurations for phased array antennas, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE INVENTION

Figure 1:
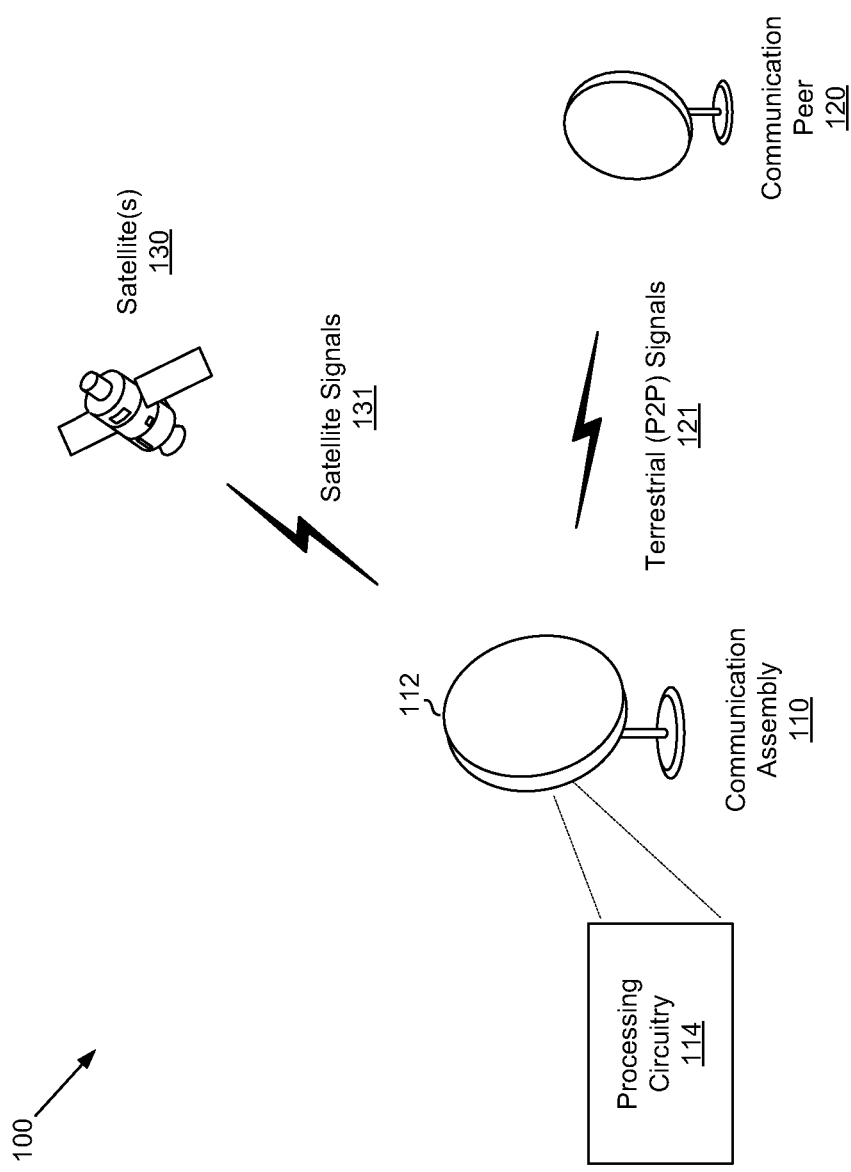
FIG. 1 illustrates an example communication setup that may be utilized in conjunction with the present disclosure.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Various implementations in accordance with the present disclosure relate to methods and systems for a utilizing ultra-efficiency low noise configurations for phased array antennas. An example system in accordance with the present disclosure may comprise a phased array antenna that comprises a plurality of antenna elements; one or more radio frequency (RF) frontend circuits, with each RF frontend circuit comprising a plurality of phase shifters and controlling operation and/or configuration of a corresponding subset of the plurality of antenna elements based on one or more control signals; and one or more configuration circuits for controlling the plurality of the RF frontend circuits.

In an example implementation, the radio frequency (RF) frontend circuits comprise radio frequency integrated circuit (RFIC) frontends.

In an example implementation, the radio frequency (RF) frontend circuits are embedded into the phased array antenna itself.

In an example implementation, the one or more configuration circuits comprise a single setting circuit that sets the one or more control signals applied to each of the one or more RF frontend circuits. The single setting circuit may comprise a selector circuit that outputs the one or more control signals to one of the plurality of level holder circuits, based on a selection control signal.

In an example implementation, the one or more configuration circuits comprise at least one signal adjusting circuit that adjusts at least one input to the single setting circuit. The at least one signal adjusting circuit may comprise a digital-to-analog converter (DAC) circuit.

In an example implementation, the one or more configuration circuits comprise a single setting circuit that sets the one or more control signals applied each of the one or more RF frontend circuits.

In an example implementation, the one or more processing circuits may be operable to classify the data during processing of the real-time. The data may be classified based on one or more of: a corresponding severity; a corresponding triggering type; a corresponding gathering mechanism; a corresponding time validity type; and a corresponding periodicity of the data.

In an example implementation, the one or more configuration circuits comprise a plurality of setting circuits, with each of the plurality of signal setting circuits setting a particular control parameter for a respective one of the one or more RF frontend circuits. The plurality of signal setting circuits may comprise a plurality of digital-to-analog converter (DAC) circuits.

An example radio frequency integrated circuit (RFIC) frontend in accordance with the present disclosure may comprise a plurality of phase shifter circuits, where each of the plurality of phase shifter circuits controls shifts of one or more corresponding antenna elements; and one or more configuration circuits for controlling the plurality of phase shifter circuits based on one or more control signals.

In an example implementation, the one or more configuration circuits comprise a plurality of level holder circuits associated with the plurality of phase shifter circuits. Each of plurality of level holder circuits may be associated with a corresponding one of the plurality of phase shifter circuits.

In an example implementation, each of plurality of level holder circuits sets one or more control parameters of a particular one of the plurality of phase shifter circuits.

In an example implementation, the RFIC frontend comprises a selector circuit that provides output to one of the plurality of level holder circuits based on the one or more control signals.

In an example implementation, the one or more configuration circuits comprise a single level holder circuit that sets one or more control parameters of a particular one of the plurality of phase shifter circuits. The single level holder circuit may select the particular one of the plurality of phase shifter circuits based on a selection control signal.

In an example implementation, the one or more configuration circuits comprise at least one signal adjusting circuit that adjusts at least one of the one or more control signals. The at least one signal adjusting circuit may comprise an analog-to-digital converter (ADC) circuit.

FIG. 1 illustrates an example communication setup that may be utilized in conjunction with the present disclosure. Shown in FIG. 1 is a communication setup 100.

The communication setup 100 comprises a plurality of communication elements (as well as, optionally, communication related resources, such as storage resources, processing resources, routing resources, etc.). The communication elements may communicate with one another, using direct and/or indirect links or connections (wireless and/or wired), in accordance with particular bands, interfaces, and/or protocols/standards.

For example, as shown in the particular use scenario illustrated in FIG. 1, a communication assembly 110 may communicate with the nearby terrestrial-based communication peer 120. In this regard, the communication assembly 110 may be used to facilitate point-to-point (P2P) communications with the communication peer 120, whereby the two elements may communicate using P2P signals 121. In addition to use in terrestrial (on-Earth) P2P communications, communication assembly 110 may also be used for satellite communications and/or other deep space radio communications. For example, as shown in the implementation depicted in FIG. 1, the communication setup 100 may also comprise one or more satellites 130, and the communication assembly 110 may be configured to communicate with the satellite(s) 130. In this regard, each satellite 130 may be utilized to communicate satellite signals 131 (which typically comprise only downlink communication signals; but the disclosure is not so limited, and in some instances the satellite signals 131 may also comprise uplink signals). In an example implementation, communication setup 100 may be configured for, for example, microwave (uWave) or millimeter wave (mm-Wave) communications.

The communication assembly 110 (and similarly the communication peer 120) may be configured for supporting P2P communications (e.g., being installed at particular location to allow transmission and/or reception of signals). For example, the communication assembly 110 may comprise an antenna 112 and processing circuitry 114. In this regard, the antenna 112 is used in handling reception and/or transmission signals (e.g., radio frequency (RF) signals), and the processing circuitry 114 may comprise suitable circuitry for processing received and/or transmitted signals (as well as, optionally, performing additional processing functions). The processing circuitry 114 may be directly incorporated into the antenna 112 (e.g., to components thereof, housing of the antenna, etc.). Alternatively or additionally, the processing circuitry 114 (or part thereof) may be implemented as a separate physical component that is coupled to the antenna 112.

On the receive-side, the processing circuitry 114 may be configured to, for example, process captured signals, so as to recover data carried therein, and to generate an output corresponding to the recovered data, which may be suitable for transmission to other devices that may handle use and/or distribution of the data. The distribution of the data may be made over one or more particular types of connections or links, and/or in accordance with one or more protocols.

On the transmit-side, the processing circuitry 114 may be configured to, for example, receive data intended for transmission, and may process the data (or any signals carrying the data) to enable generation of corresponding signals (carrying the data), with the generated signals being particularly configured or adapted for transmission via the antenna 112, and/or for transmission to particular intended recipient (e.g., the communication peer 120). Example processing functions that may be performed by the processing circuitry 114 may comprise amplification, filtering, down-conversion (e.g., RF signals to IF signals), up-conversions (e.g., IF to RF), analog-to-digital conversion and/or digital-to-analog conversion, encoding and/or decoding, encryption and/or decryption, modulation and/or demodulation, etc.

Various antenna designs and/or technologies may be used (and accordingly, the processing circuitry 114 may be modified based on these particular designs). For example, the antenna 112 may be a parabolic antenna (e.g., comprising parabolic reflector), which may be used for capturing signals, such as by reflecting them into a particular point (e.g., focal point of the parabolic reflector); and/or may be used for transmitting signals, such as by deflecting signals emitted from the focal point of the parabolic reflector.

Alternatively, the antenna 112 may be configured as phased array antenna, which typically comprises a controlled array of antennas (or antenna elements) that may be electronically directed or steered in different directions or a particular direction (i.e., without physically moving the antennas or antenna elements), which allows creating beams of radio waves in a direction (e.g., during transmission) and/or captures beams of radio waves arriving in a particular direction (e.g., during reception).

Further, additional measures or techniques may be used to enhance performance during communication operations. For example, multiple-input and multiple-output (MIMO) techniques may be to enhance performance in communication systems (e.g., the communication setup 100). In this regard, use of MIMO may increase capacity of radio links, by using multiple transmit and receive antennas to exploit multipath propagation.

In some instances, design features and/or techniques selected to meet particular performance requirements may cause potential issues or raise certain challenges that must be addressed to ensure optimal performance. For example, use of multi-user massive MIMO antennas at uWave and mmWave bands is becoming popular for existing and/or future technologies or applications, such as 5G (5th generation) mobile technologies. In this regard, multi-user massive MIMO (MU-MIMO) phased arrays antennas configured for operation at uWave at mmWave bands are being targeted for use in planned 5G infrastructure/networks.

When configured for use in conjunction with certain technologies (e.g., 5G technologies) and/or under certain conditions, the antennas generally meet certain requirements. For example, antennas configured for operation at uWave and/or mmWave bands may be characterized by having a large number of antenna elements (e.g., more than 100), supporting duplexing (e.g., time-division duplexing (TDD) and frequency-division duplexing (FDD); and by having low phase shift/variable gain accuracy. Further, due to the high link loss at uWave and mmWave bands, these antennas introduce very high gain when operating at these bands, which renders the configuration of such antennas very complex. In this regard, such antennas consist of large number antenna elements, with corresponding large number of components for controlling operations of these antenna elements that must be configured.

For example, such antennas may have a large number (e.g., hundreds) of phase shifters, which are configured (and re-configured) to properly control the antenna elements in accordance with performance requirements. In this regard, to meet performance requirements, use of complex antenna beam pattern(s) may be needed in such antennas. In particular, the beam pattern may be expected to be very complex to support complex channels, such as in conjunction with non-line-of-sight (NLOS) communications.

Further, the beam pattern(s), and various components of the antennas, may need to be (re-)configured to meet the changes in the channels and in the users' locations, and may need to do so frequently. In this regard, complex beam patterns may be recalculated frequently (e.g., hundreds of times per second) to track the fast changes in the channels conditions and the users' locations, and adjustments may need to be applied to the systems used in the transmission/ reception frequently—e.g., on-antenna phase shifters need be (re-)configured in a high rate in order to (re-)construct the beam patterns. Such frequent (re-)configuration may create issues in existing systems, if such (re-)configuration is even possible.

For example, use of a traditional approach (if even possible), may have many disadvantages. In this regard, traditional configuration of phase shifters is based on the digital approach. However, when using phased array antennas (particularly, multi-user massive MIMO antennas), the number of configurations needed per beam pattern may be substantial (e.g., requiring thousands of transactions).

Therefore, using the traditional digital configuration approach may result in the configuration duration becoming too long (e.g., thousands of configuration cycles, thus dramatically increasing time required for configuration). In addition, digital configuration by its nature is very noisy, and as such may adversely affect the system performance, and may also reduce spectral efficiency. Further, digital configuration schemes may not be applicable for tracking fine tuning stages which are performed during receiving time. In addition, in some instances each of the phase shifters used in phased array antennas may allow both phase and gain (re-)configuration. This may further increase configuration duration—e.g., the two configuration dimensions increase the required configuration cycles by 2.

Accordingly, phased array antennas may be implemented in accordance with the present disclosure to address such issues and/or meet such requirements, such as by supporting highly efficient configuration (e.g., in terms of required time and resources), and with very low noise. This may allow for reducing system cost (e.g., via lower implementation complexity), and for increasing spectral efficiency (e.g., via very low configuration overhead).

For example, in various implementations in accordance with the present disclosure, phased array antennas may be configured to utilize highly efficient configuration schemes to configure large arrays of phase shifters. In this regard, in some implementations, groups of phase shifters may be configured separately to expedite configuration of the antennas as whole. For example, several phase shifters may be packed in single radio frequency integrated circuit (RFIC) frontends, with the configuration scheme being devise based on configuration of the individual RFIC frontends. This may allow meeting operational requirements that traditional approaches may not permit. For example, implementations in accordance with the present disclosure may utilize configuration schemes that may meet requirements of such systems and use scenarios as 5G MU-MIMO antennas. In this regard, the efficient configuration schemes utilized and/ or supported in antennas implemented in accordance with the present disclosure may meet operational requirements of such use scenarios, as they allows for practical beam fine tuning and tracking, and to do so during signal reception periods.

Example implementations of radio frequency integrated circuit (RFIC) frontends and/or phased array antennas designed based thereon are described below.

Figure 2:
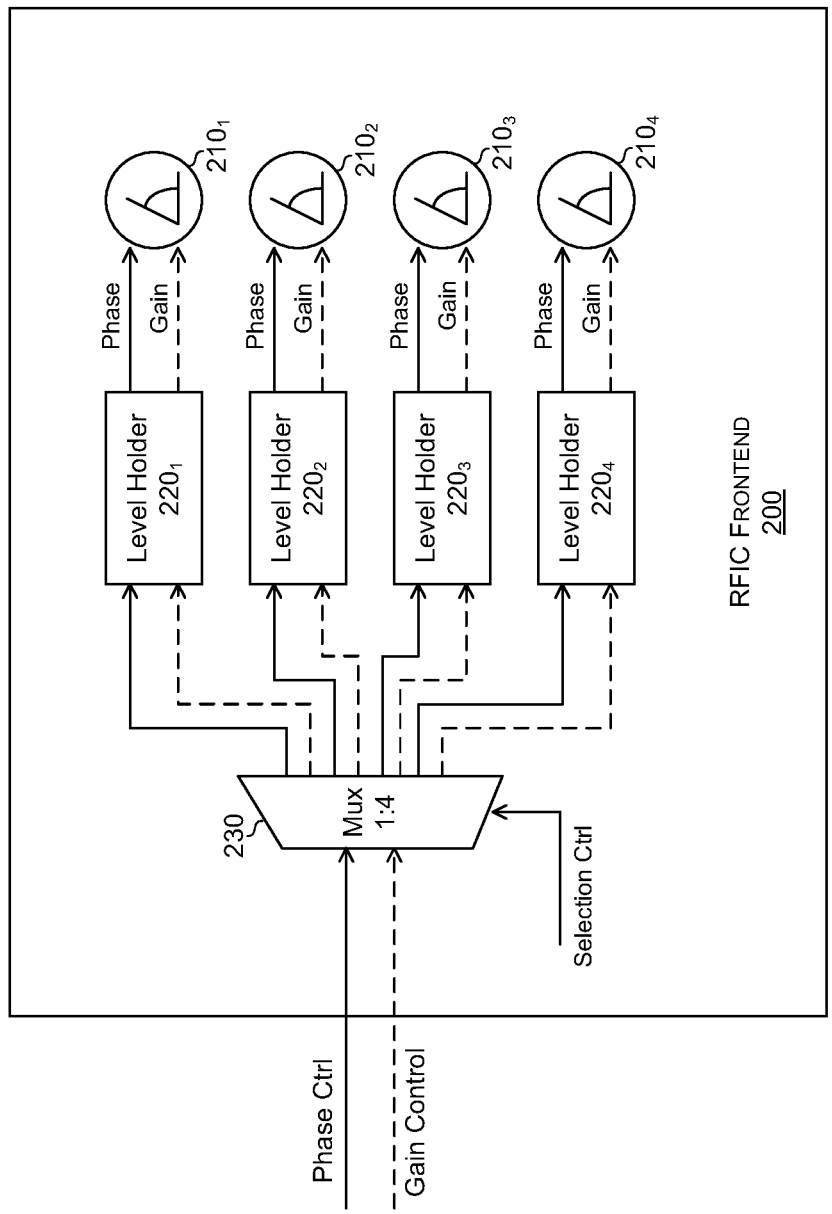
FIG. 2 illustrates an example radio frequency integrated circuit (RFIC) frontend, in accordance with the present disclosure.

FIG. 2 illustrates an example radio frequency integrated circuit (RFIC) frontend, in accordance with the present disclosure. Shown in FIG. 2 is a radio frequency integrated circuit (RFIC) frontend 200.

The RFIC frontend 200 may comprise suitable circuitry for controlling and/or configuring a plurality of antenna elements in a phased array antenna. In particular, the RFIC frontend 200 may be implemented as an integrated circuit, which comprises a number of electronic circuits on one small flat piece (e.g., a microchip) of semiconductor material, with the circuits performing functions or operations required for handling wireless transmission and reception of signals, particularly radio frequency (RF) signals, as well as any additional required functions—e.g., functions relating to efficient configuration of the antenna elements or the phased array antenna as a whole.

The RFIC frontend 200 may be configure and control the phase shifting applied to each of the corresponding antenna elements. For example, as shown in FIG. 2, the RFIC frontend 200 may comprise a plurality of phase shifter circuits 210 (e.g., 4 of them, $210_1$-$210_4$), a plurality of level holder circuits 220 (e.g., 4 of them, $210_1$-$210_4$, each corresponding to one of the phase shifter circuits 210), and a selector 230 (e.g., multiplexer or mux, such as a 4:1 mux when using 4 level holder circuits 220).

Each phase shifter circuit 210 is operable to electronically set phase of corresponding antenna element(s), to enable steering a beam of radio waves transmitted thereby by in a particular direction, and/or receiving radio waves in a particular direction.

Each level holder circuit 220 is operable to control levels (e.g., phase and/or gain) applied to the corresponding antenna element(s) via the respective phase shifter circuits 210. The level holder circuits 220 may be used to, for example, lock configured information applied to each of the corresponding phase shifter circuits 210.

The selector (mux) 230 is operable to control application of control signals to the level holder circuits, to adjust operations of the corresponding phase shifter circuits 210 (and thus the corresponding antenna element(s)).

For example, in the example implementation shown in FIG. 2, two analog controls are used for controlling the phase/gain shifter configurations. In this regard, the phase control signal (e.g., based on the voltage level thereof) defines the phase of the phase shifter, and the gain control signal (e.g., based on the voltage level thereof) defines the gain of the phase shifter. The selector 230 switches the controls between the phase shifters, and the level holder circuits 220 lock the configured information while it is applied to the corresponding phase shifter circuits 210.

Figure 3:
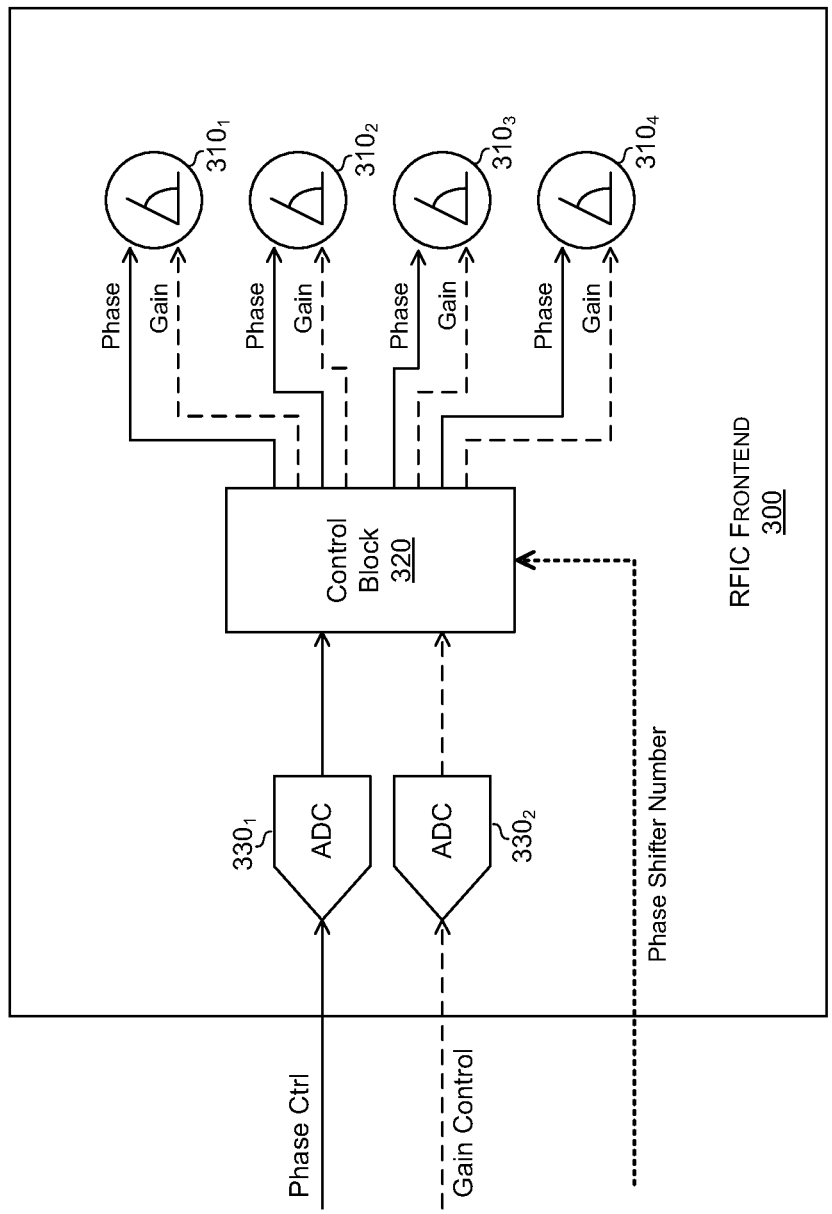
FIG. 3 illustrates another example radio frequency integrated circuit (RFIC) frontend, in accordance with the present disclosure.

FIG. 3 illustrates another example radio frequency integrated circuit (RFIC) frontend, in accordance with the present disclosure. Shown in FIG. 3 is a radio frequency integrated circuit (RFIC) frontend 300.

The RFIC frontend 300 may be substantially similar to the RFIC front 200 of FIG. 2. In this regard, the RFIC frontend 300 may similarly comprise suitable circuitry for controlling a plurality of antenna elements in a phased array, particularly by configuring and controlling phase shifting applied to each of the corresponding antenna elements. The RFIC front 300 may incorporate a different design, however.

For example, as shown in FIG. 3, the RFIC frontend 300 may comprise a plurality of phase shifter circuits 310 (e.g., 4 of them, $310_1$-$310_4$), a single level control circuit 320, and one or more pair of analog-to-digital converters (ADCs) 330, the number of which may be based on a number of control signals applied to the RFIC frontend 300—thus, the particular implementation of the RFIC frontend 300 shown in FIG. 3 comprises two ADCs $330_1$ and $330_2$, corresponding to two control signals: a phase control signal and a gain control signal.

As with the phase shifter circuit 210, each phase shifter circuit 310 is operable to electronically set phase of corresponding antenna element(s), to enable steering a beam of radio waves transmitted thereby by in a particular direction, and/or receiving radio waves in a particular direction.

The level holder circuit 320 is operable to control levels (e.g., phase and/or gain) applied to the antenna element(s) via the phase shifter circuits 310. In this regard, the (single) level holder circuit 320 effectively replaces in the RFIC frontend 300 all of the plurality of the level holder circuits 220 in the RFIC frontend 200. As such, a single control circuits may be used to control (e.g., phase and gain) levels applied to each and all of the phase shifter circuits $310_1$-$310_4$.

In an example use scenario of the RFIC frontend 300, two analog controls are used for controlling the phase/gain shifter configurations—a phase control signal and a gain control signal (similar to the same control signals described with respect to FIG. 2). The analog controls are digitized (e.g., sampled) by ADCs $330_1$ and $330_2$, and the corresponding digital level information is then stored in level control circuit 320. The level control circuit 320 may then be used to configure a particular one of the phase shifter circuits 310. In this regard, an additional control signal/line (e.g., assigned a value corresponding a particular phase shifter number—e.g., a value between 1 and 4, corresponding to one of the phase shifter circuits $310_1$-$310_4$) is applied to the level control circuit 320, to identify/assign a particular phase shifter (e.g., one of the phase shifter circuits $310_1$-$310_4$) to be configured with particular level information—e.g., current level information, corresponding to what is stored in the level control circuit 320 based on the most recent control readings.

Figure 4:
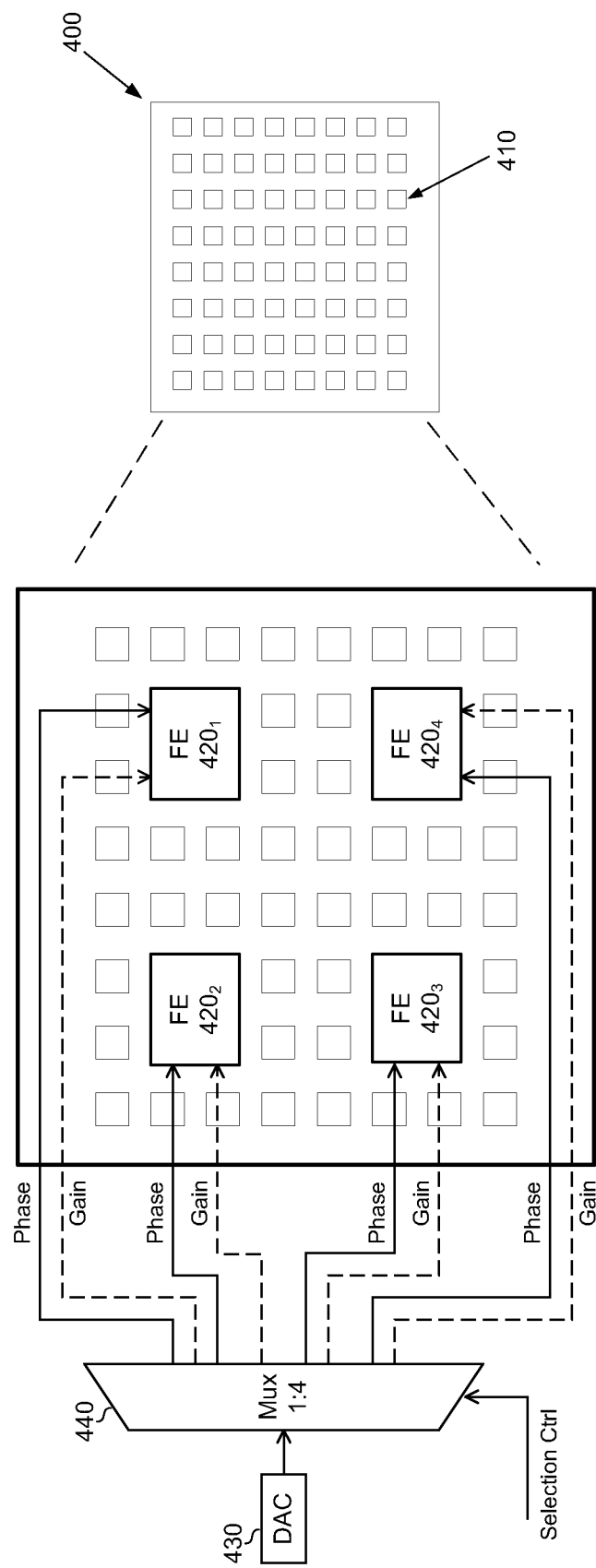
FIG. 4 illustrates an example phased array antenna incorporating radio frequency integrated circuit (RFIC) frontends implemented in accordance with the present disclosure.

FIG. 4 illustrates an example phased array antenna incorporating radio frequency integrated circuit (RFIC) frontends implemented in accordance with the present disclosure. Shown in FIG. 4 is a phased array antenna 400.

The phased array antenna 400 comprises an antenna system configured for transmission and reception of signals based on use of beamforming via an array of antenna elements. In this regard, the phased array antenna 400 comprises a number of antenna elements 410 (e.g., 64 antenna elements in the particular implementation shown in FIG. 4) arranged in 2-dimensional array (e.g., 8×8 array when comprising 64 antennas) that is used to transmit and receive signals. The transmission and reception of signals is done using beamforming—e.g., with signals transmitted or received via the antenna elements 410 being electronically steered in particular directions.

The phased array antenna 400 is designed and implemented to utilize RFIC frontends in accordance with the present disclosure. For example, in the particular example implementation illustrated shown in FIG. 4, four RFIC frontends $420_1$-$420_4$ are utilized, each of which being configured to handle 16 of the 64 antenna elements 410. Each of the RFIC frontends $420_1$-$420_4$ may be substantially similar to the RFIC frontend 200 of FIG. 2 or the RFIC frontend 300 of FIG. 3; however, each comprises 16 phase shifters (rather than 4 phase shifters, as shown in the example implementations of the RFIC frontend 200 and the RFIC frontend 300 described above), with the remaining circuits being adjusted to account for handling that many phase shifters.

The phased array antenna 400 may also comprise control circuits (e.g., embedded directly thereto; or alternatively or additionally, embedded into separate element devices, coupled to the phased array antenna 400). The control circuits are configured for use in conjunction with a control scheme that is used to control the phased array antenna 400—e.g., configure the antenna elements 410 via the RFIC frontends $420_1$-$420_4$. In this regard, various overall control schemes (and correspondingly, the control circuits used therefor) may be used.

For example, as shown in FIG. 4, the phased array antenna 400 may be configured for use of a sequential control scheme, where the RFIC frontends $420_1$-$420_4$ are configured sequentially—that is, a particular one of the RFIC frontends $420_1$-$420_4$ may be configured at a given point. The control circuits for supporting such scheme may comprise a single digital-to-analog converter (DAC) 430 and a selector 440 (e.g., multiplexer or mux, such as 4:1 mux when using 4 RFIC frontends). In this regard, the DAC 430 may convert digital information for the phased array antenna 400 to an analog input applied to the selector 440, which may output to a particular one of the RFIC frontends $420_1$-$420_4$, such as based on a selection control signal, corresponding analog controls (e.g., phase and gain controls). The RFIC frontends $420_1$-$420_4$ may then utilize the analog phase and gain controls, such as in accordance with the particular implementation—e.g., as described with respect to FIGS. 2 and 3, above. An alternative control scheme is described with respect to FIG. 5.

Figure 5:
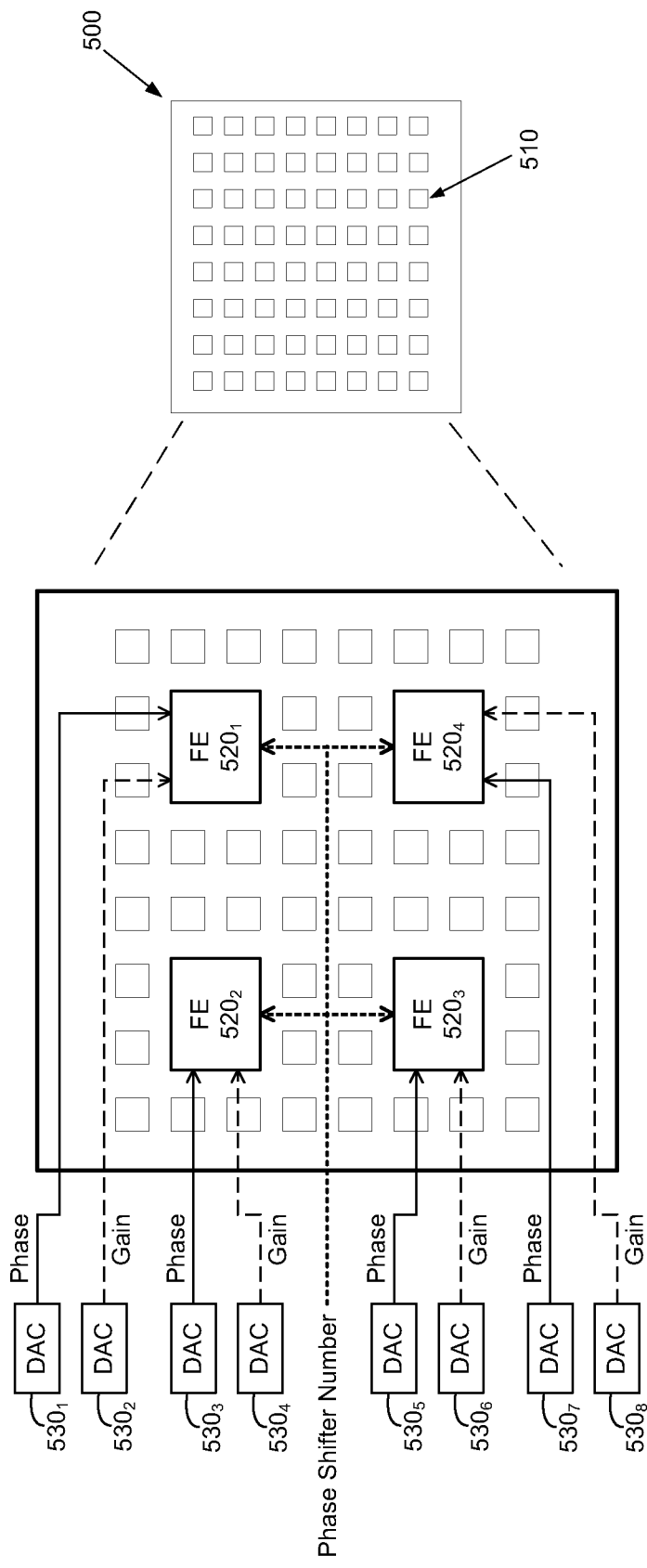
FIG. 5 illustrates another example phased array antenna incorporating radio frequency integrated circuit (RFIC) frontends implemented in accordance with the present disclosure.

FIG. 5 illustrates an example phased array antenna incorporating radio frequency integrated circuit (RFIC) frontends implemented in accordance with the present disclosure. Shown in FIG. 5 is a phased array antenna 500.

The phased array antenna 500 may be substantially similar to the phased array antenna 400 of FIG. 4—e.g., being an antenna system configured for transmission and reception of signals based on use of beamforming via an array of antenna elements 510 (e.g., 64 antenna elements arranged into 2-dimensional 8×8 array) that may be configured for electronic steering in particular direction for transmission and reception of radio frequency (RF) signals.

As with the phased array antenna 400 of FIG. 4, the phased array antenna 500 is also designed and implemented to utilize RFIC frontends in accordance with the present disclosure—e.g., similarly utilizing 4 RFIC frontends $520_1$-$520_4$, which are substantially similar to the RFIC frontends $420_1$-$420_4$ of FIG. 4, with each being similarly configured to handle 16 of the 64 antenna elements 510.

The phased array antenna 500 may be configured to support a parallel control scheme, however. In this regard, the control circuits used in the phased array antenna 500 may comprise a plurality of low rate digital-to-analog converters (DACs) 530, each of which handling a particular analog control signal. For example, with reference to the particular implementation illustrated in FIG. 5, the phased array antenna 500 comprises 8 DACs $530_1$-$530_8$ configured in pairs, with each pair of DACs providing the phase/gain controls to corresponding one of the RFIC frontends $520_1$-$520_4$. Thus, the phase/gain controls may be provided to the RFIC frontends $520_1$-$520_4$ in parallel.

Use of phase array antennas such as ones described with respect to FIGS. 4 and 5—that is, phase array antennas incorporating use of efficient configuration schemes (e.g., based on RFIC frontends), provide various improvements. For example, one advantage of the configuration schemes that may be used with these phase array antennas is a low electrical noise during the configuration period. In this regard, the analog control level transactions may be very small. With such very small analog control levels, along with low number of transactions required for full configuration, it is reasonable to configure the antennas during the receiving period. For example, with use of such parallel configuration scheme in such antennas as the illustrated in FIG. 5, only 16 configuration cycles are needed to form the beam pattern (single cycle per each of the phase shifter in the RFIC frontends $520_1$-$520_4$). In both cases, the configuration is done in very low noise such it can be performed on-line while receiving signal.

Implementations in accordance with the present disclosure may allow for simplified designs for packing a large number (e.g., hundreds) of phase shifters on antennas, which may be configured in highly efficient way—e.g., quickly while requiring only few and simple components, such as a few simple low rate DACs, which may be readily available in existing controllers. Further, the simplicity of implementations in accordance with the present disclosure may allow for cheap designs. This is may be particularly desirable as phase shifters configuration may represent the bottleneck in an overall antenna configuration period and the biggest factor in design complexity.

Implementations in accordance with the present disclosure may be particularly suitable for such use scenarios as 5G MU-MIMO antennas (operating at uWave and mmWave bands) and high gain backhaul antennas. Nonetheless, the disclosure is not limited to such applications, and the same approach may be used in any architecture requires high gain electronically steerable antennas.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system, comprising:
a phased array antenna comprising a plurality of antenna elements;
one or more radio frequency (RF) frontend circuits, wherein each of the one or more RF frontend circuits:
comprises a plurality of phase shifters; and
controls operation of a corresponding subset of the plurality of antenna elements based on one or more control signals; and
one or more control circuits for controlling the plurality of the RF frontend circuits during configuration of the plurality of antenna elements, wherein:
the one or more control circuits comprises a selector circuit that outputs the one or more control signals to the one or more RF frontend circuits, based on a selection control signal; and
the one or more control circuits comprises at least one signal adjusting circuit that adjust at least one input to the selector circuit, and wherein the at least one signal adjusting circuit comprises a digital-to-analog converter (DAC) circuit.

2. The system of claim 1, wherein the radio frequency (RF) frontend circuits comprise radio frequency integrated circuit (RFIC) frontends.

3. The system of claim 1, wherein the radio frequency (RF) frontend circuits are embedded into the phased array antenna.

4. A system, comprising:
a phased array antenna comprising a plurality of antenna elements;
one or more radio frequency (RF) frontend circuits, wherein each of the one or more RF frontend circuits:
comprises a plurality of phase shifters; and
controls operation of a corresponding subset of the plurality of antenna elements based on one or more control signals; and
one or more control circuits for controlling the plurality of the RF frontend circuits during configuration of the plurality of antenna elements, wherein:
the one or more control circuits comprises a setting circuit that sets the one or more control signals applied to each of the one or more RF frontend circuits;
the one or more control circuits comprises at least one signal adjusting circuit that adjust at least one input to the setting circuit; and
the at least one signal adjusting circuit comprises a digital-to-analog converter (DAC) circuit.

5. The system of claim 4, wherein the radio frequency (RF) frontend circuits comprise radio frequency integrated circuit (RFIC) frontends.

6. The system of claim 4, wherein the radio frequency (RF) frontend circuits are embedded into the phased array antenna.

7. A system, comprising:
a phased array antenna comprising a plurality of antenna elements;
one or more radio frequency (RF) frontend circuits, wherein each of the one or more RF frontend circuits:
comprises a plurality of phase shifters; and
controls operation of a corresponding subset of the plurality of antenna elements based on one or more control signals; and
one or more control circuits for controlling the plurality of the RF frontend circuits during configuration of the plurality of antenna elements;
wherein the one or more control circuits comprises a plurality of setting circuits, each of the plurality of setting circuits setting a particular control parameter for a respective one of the one or more RF frontend circuits; and
wherein the plurality of setting circuits comprise a plurality of digital-to-analog converter (DAC) circuits.

8. The system of claim 7, wherein the radio frequency (RF) frontend circuits comprise radio frequency integrated circuit (RFIC) frontends.

9. The system of claim 7, wherein the radio frequency (RF) frontend circuits are embedded into the phased array antenna.

10. A radio frequency integrated circuit (RFIC) frontend, comprising:
a plurality of phase shifter circuits, wherein each of the plurality of phase shifter circuits controls shifts of one or more corresponding antenna elements; and
one or more control circuits for controlling the plurality of phase shifter circuits based on one or more control signals, wherein:
the one or more control circuits comprises a single level holder circuit that sets one or more control parameters of a particular one of the plurality of phase shifter circuits, and
the single level holder circuit selects the particular one of the plurality of phase shifter circuits based on a selection control signal:
wherein the one or more control circuits comprises at least one signal adjusting circuit that adjust at least one of the one or more control signals, and wherein the at least one signal adjusting circuit comprises an analog-to-digital converter (ADC) circuit.

11. A radio frequency integrated circuit (RFIC) frontend, comprising:
a plurality of phase shifter circuits, wherein each of the plurality of phase shifter circuits controls shifts of one or more corresponding antenna elements; and
one or more control circuits for controlling the plurality of phase shifter circuits based on one or more control signals, wherein:
the one or more control circuits comprises at least one signal adjusting circuit that adjust at least one of the one or more control signals;
the at least one signal adjusting circuit comprises an analog-to-digital converter (ADC) circuit.

* * * * *